Jan. 28, 1964    M. K. BUCHNER    3,119,425
MACHINE FOR PITTING FRUIT
Filed Sept. 21, 1960    9 Sheets-Sheet 1
FIG_1
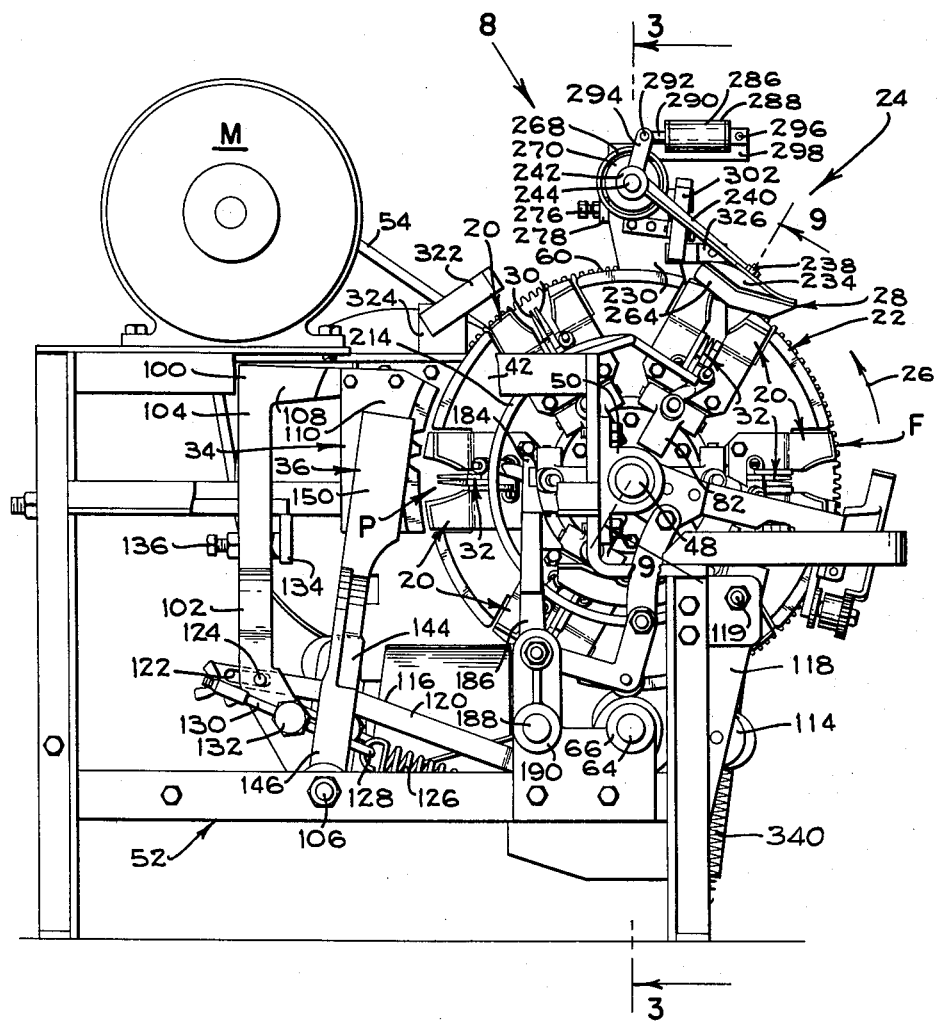
INVENTOR
MARVIN K. BUCHNER
BY Hans G. Hoffmeister
ATTORNEY

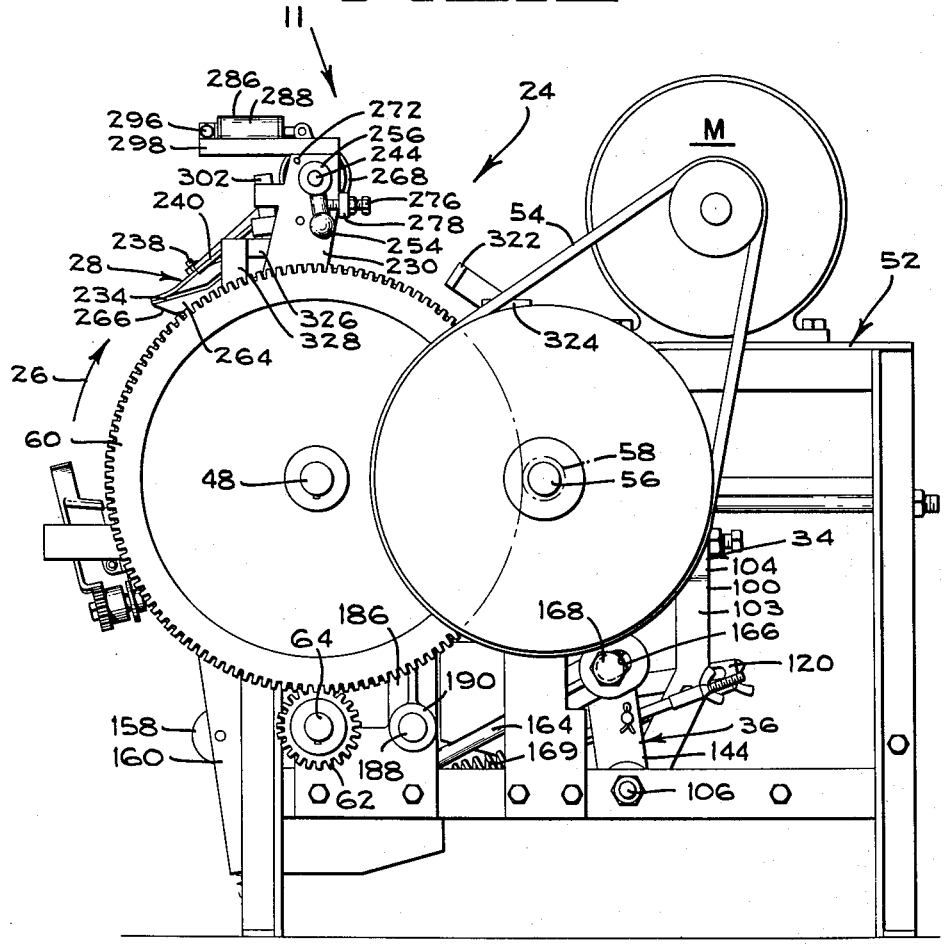

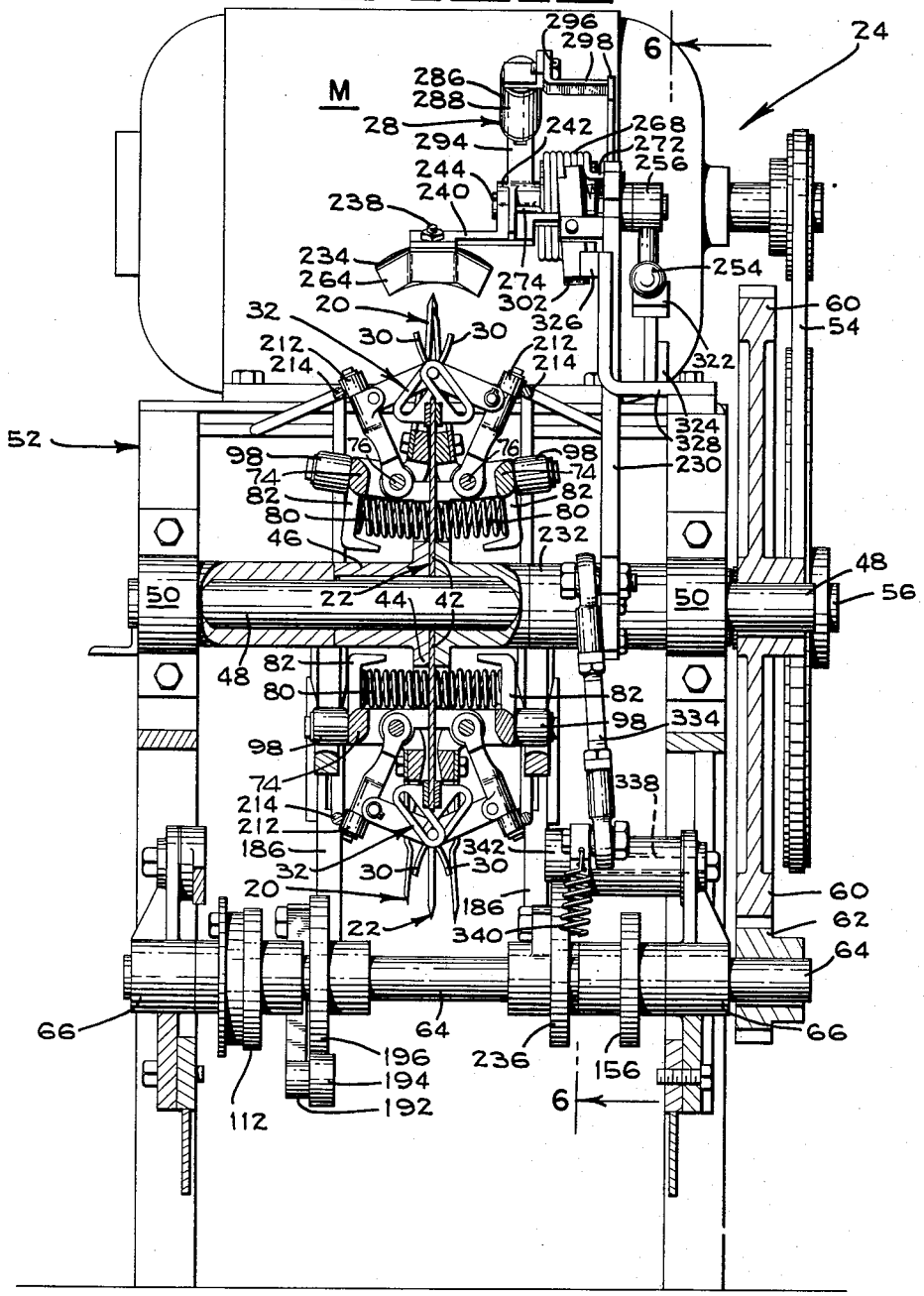

Jan. 28, 1964 M. K. BUCHNER 3,119,425
MACHINE FOR PITTING FRUIT
Filed Sept. 21, 1960 9 Sheets-Sheet 4
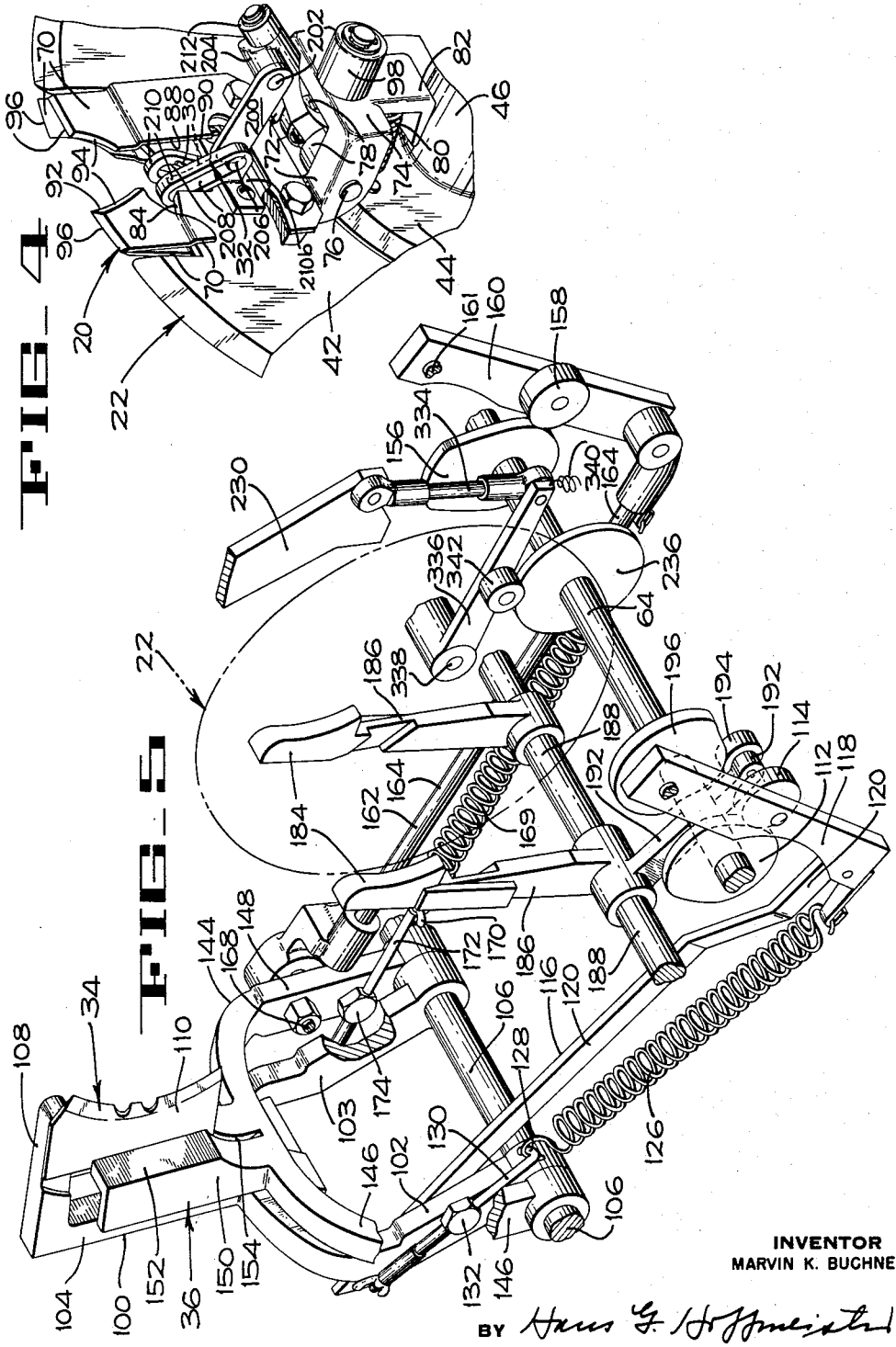
INVENTOR
MARVIN K. BUCHNER
BY
ATTORNEY

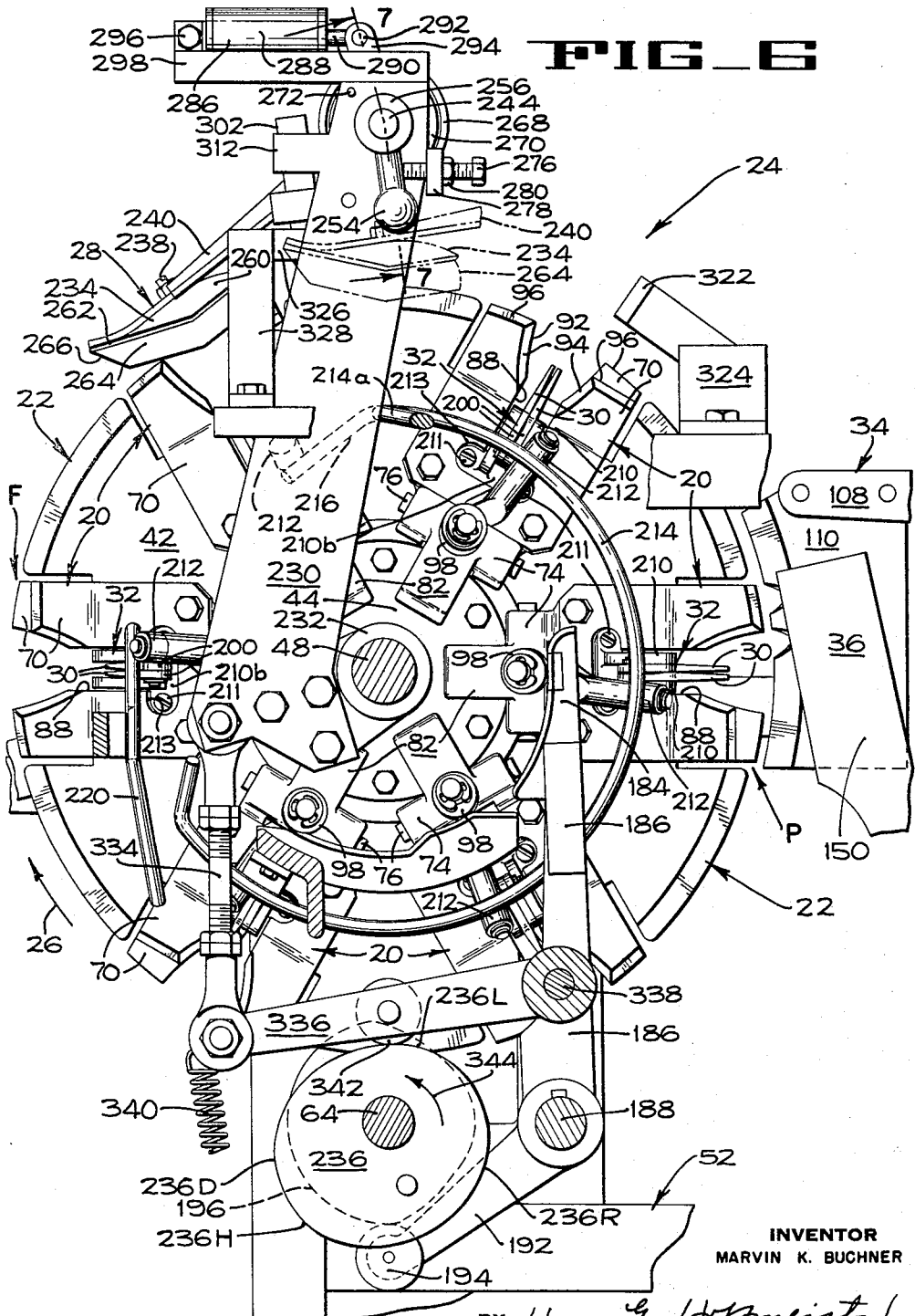

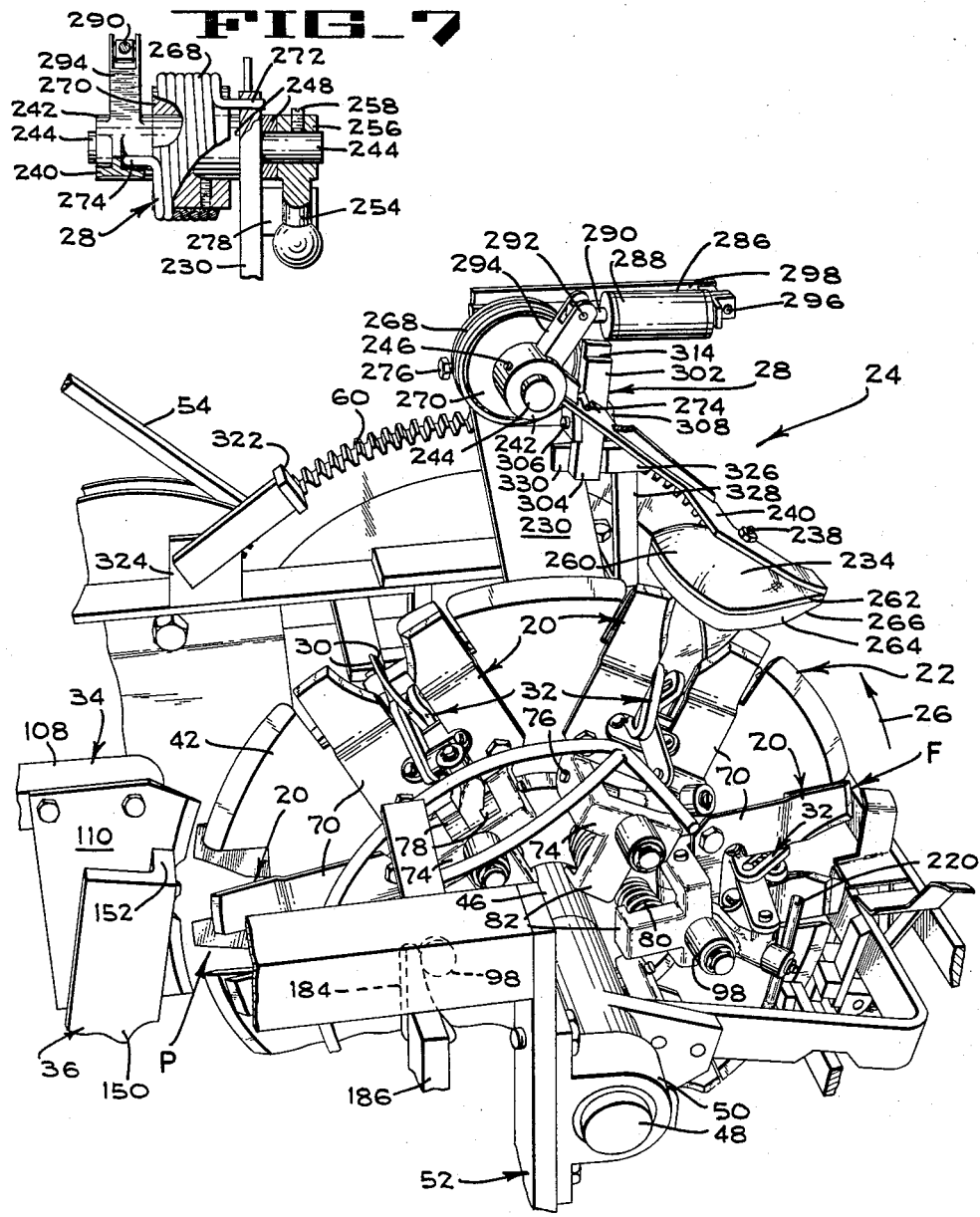

Jan. 28, 1964 M. K. BUCHNER 3,119,425
MACHINE FOR PITTING FRUIT
Filed Sept. 21, 1960 9 Sheets-Sheet 7
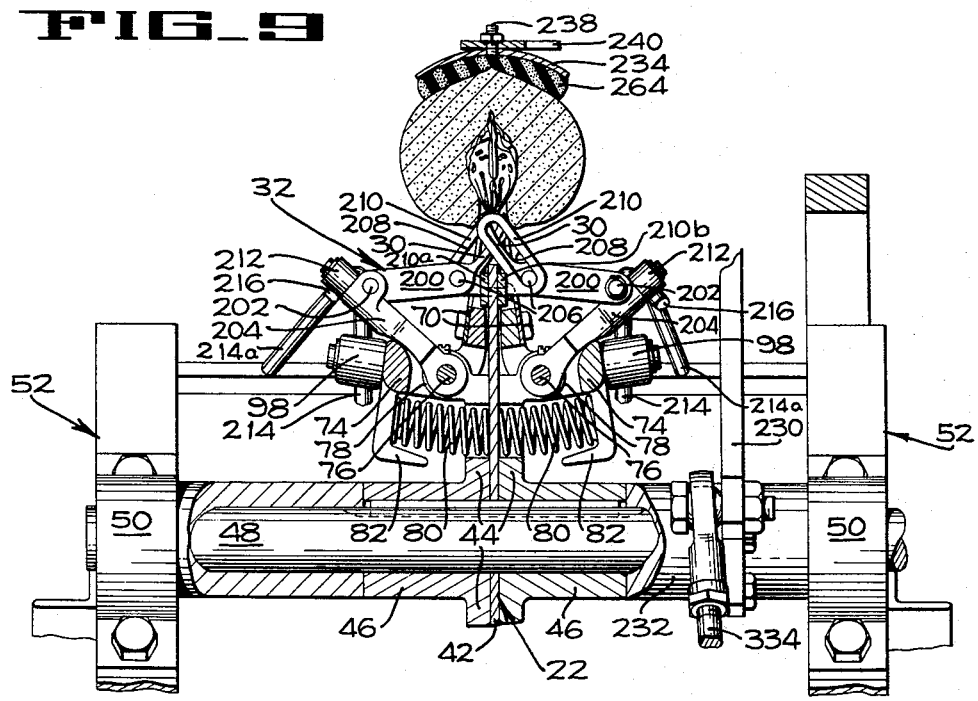
FIG_9
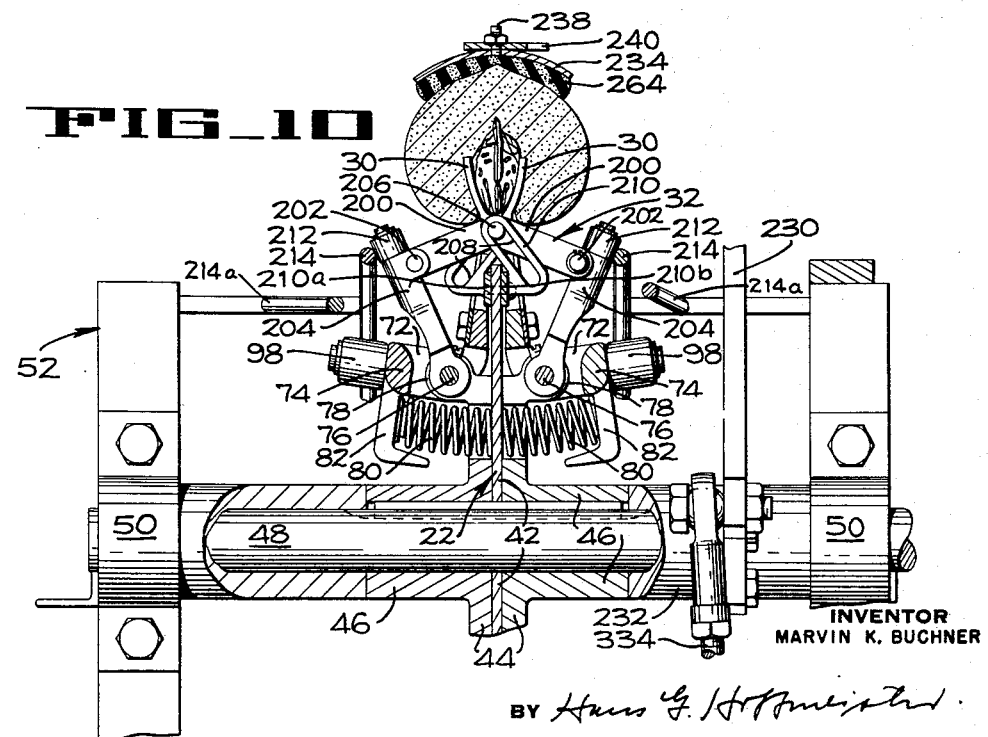
FIG_10
INVENTOR
MARVIN K. BUCHNER
BY Hans G. Hoffmeister
ATTORNEY Jan. 28, 1964   M. K. BUCHNER   3,119,425
MACHINE FOR PITTING FRUIT
Filed Sept. 21, 1960   9 Sheets-Sheet 8
FIG_11
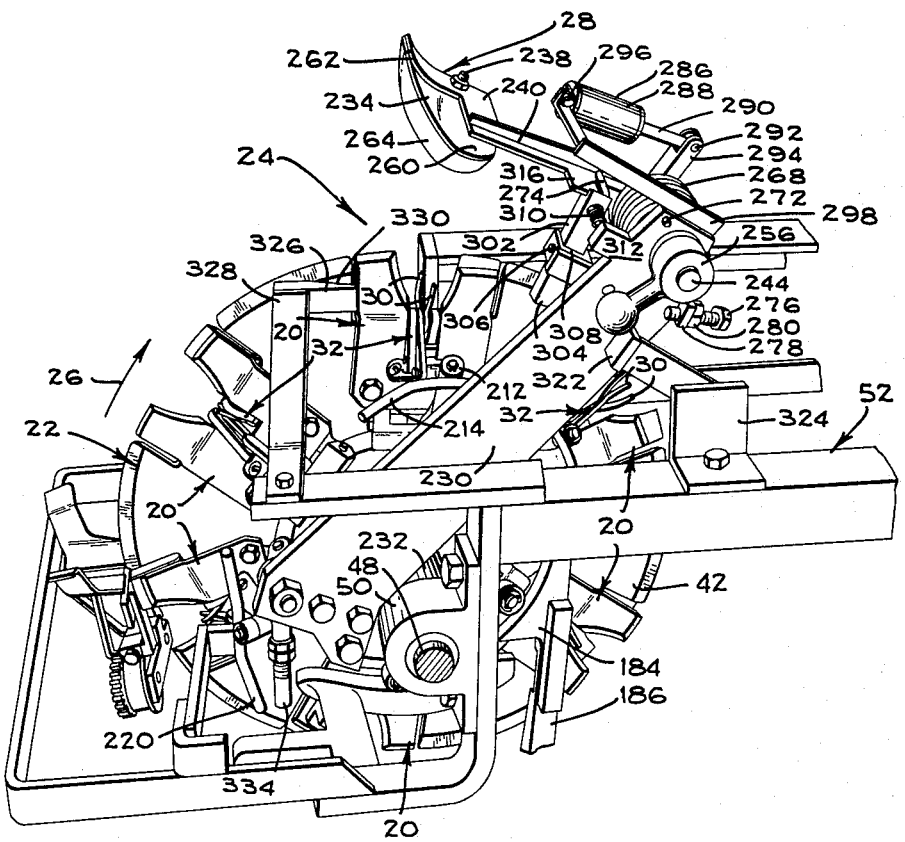
INVENTOR
MARVIN K. BUCHNER
BY
ATTORNEY

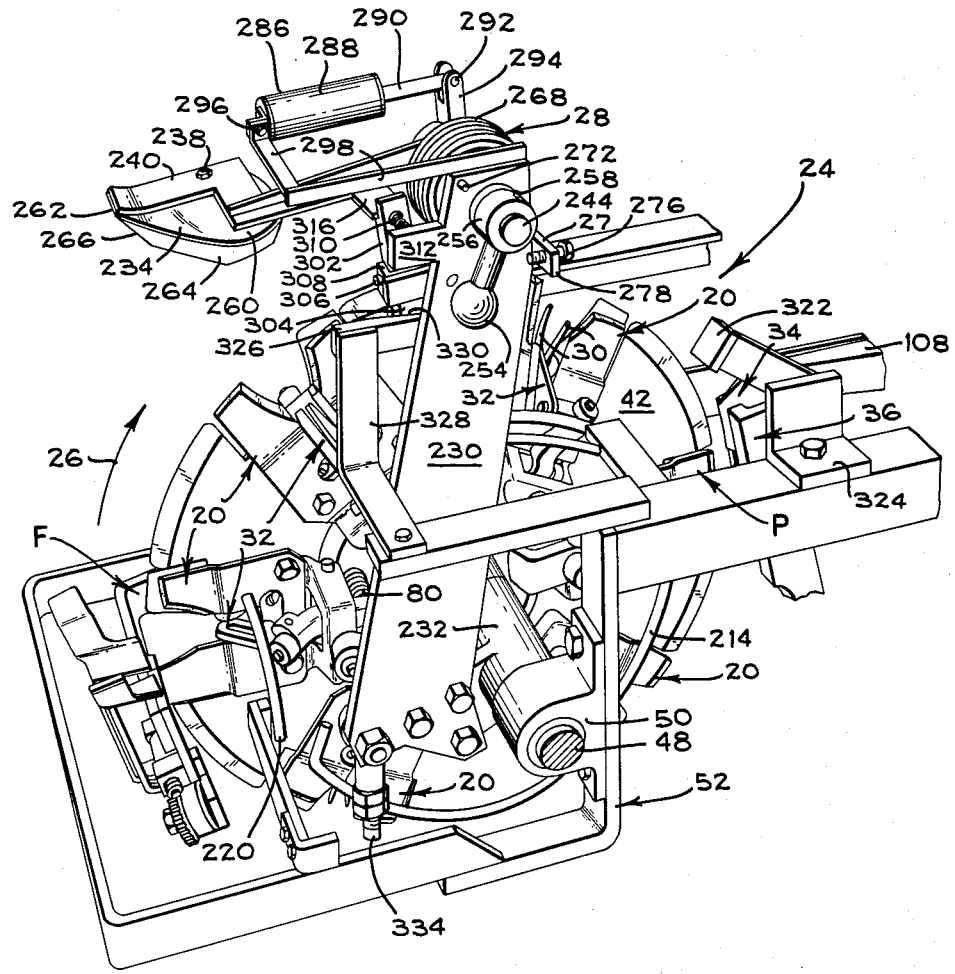

United States Patent Office 3,119,425
Patented Jan. 28, 1964

3,119,425
MACHINE FOR PITTING FRUIT
Marvin K. Buchner, San Jose, Calif., assignor to FMC Corporation, a corporation of Delaware
Filed Sept. 21, 1960, Ser. No. 57,553
17 Claims. (Cl. 146—28)

The present invention appertains to machines for pitting fruit such as freestone peaches, and relates more particularly to apparatus in a machine of this character for securing a fruit therein in a predetermined position on a carried by means of pit retaining means, and for holding the fruit in such position during insertion of the pit retaining means into the fruit.

An object of the present invention is to provide an improved freestone peach pitter.

Another object is to provide a freestone peach pitter having improved means thereon movable into a fruit on the carrier in a manner to engage the pit to retain the pit and the peach in predetermined position on the carrier yet avoid damage to the fruit meat.

Another object is to provide means for holding the peach in predetermined position on the carrier during insertion of the retaining means into the peach.

These and other objects and advantages of the present invention will become apparent from the accompanying drawings, in which:

FIG. 1 is an elevation of a freestone peach pitting machine, with certain parts broken away, as viewed from one side and including apparatus embodying the present invention.

FIG. 2 is an elevation of the machine shown in FIG. 1 as viewed from the opposite side of the machine.

FIG. 3 is an enlarged vertical transverse section taken along line 3—3 of FIG. 1 with certain parts in a different position than shown in FIGS. 1 and 2.

FIG. 4 is an enlarged fragmentary perspective showing a portion of the present freestone pitting machine.

FIG. 5 is a fragmentary diagrammatic perspective showing part of the operating mechanism of the present peach pitter.

FIG. 6 is an enlarged fragmentary vertical section of the pitting machine taken substantially along line 6—6 of FIG. 3.

FIG. 7 is a detail of a portion of FIG. 6, partly in section and taken along lines 7—7 of FIG. 6.

FIG. 8 is an enlarged perspective showing a portion of the present peach pitter as viewed looking downwardly and inwardly from the left side of the machine in the direction indicated in general by the arrow 8 of FIG. 1.

FIG. 9 is an enlarged fragmentary radial section along lines 9—9 of FIG. 1.

FIG. 10 is a section similar to FIG. 9, showing parts thereof in a later operational position.

FIG. 11 is an enlarged perspective showing a portion of the present peach pitter as viewed looking downwardly and inwardly from the right side of the machine in the direction indicated in general by the arrow 11 of FIG. 2, but with the peach holding apparatus in a later operational position.

FIG. 12 is a view similar to FIG. 11, showing the peach holding apparatus in its final operational position immediately preceding that shown in FIGS. 6 and 8.

According to the invention a fruit is impaled, stem end first, along its suture plane at a feed station F (FIG. 1) on one of six similar fruit spreading or dividing means 20 that are equally spaced in circular array about a rotary turret or carrier 22 of the freestone peach pitting machine 24. As the friut is impaled, the spreading means 20 partially severs the individual fruit inwardly from the stem end thereof and partially about the pin. The car-carrier 22, conveying the impaled fruit in the direction indicated by the arrow 26, advances the fruit to a location where a peach holding apparatus 28 appropriately engages the blossom end of the peach during its continued advance. Each fruit spreading unit 20 is provided with a pit retaining mechanism 32 including a pair of cooperating prongs 30 which are movable radially of the turret. The prongs 30 are disposed in an inner withdrawn position at feed station F but are later projected radially outwardly into the peach. During the peach penetrating movement of the prongs, the hold-down mechanism 28 prevents the peach from being pushed off the fruit dividing means. When the pit securing prongs 30 are fully projected into the peach the peach holding apparatus 28 is retracted from engagement with the peach during continued advance of the peach toward a processing station P.

At the processing station P, fruit splitting means 34 (FIG. 1) scores or severs the flesh of the fruit inwardly from the blosson end of the peach opposite the fruit spreading means 20. A fruit presser mechanism 36 then engages the blossom end of the peach to securely seat its pit against the pit retaining prongs 30 and against the fruit dividing means 20. Thereafter, the fruit spreading means 20 operates to separate or spread the halves of the divided fruit and initiate the gravity discharge of the halves from the pit which is temporarily retained by the retaining prongs 30 for subsequent discharge from the carrier 22. Later, before the fruit spreading unit 20 is returned to the feed station F, the pit holding mechanism 32 is actuated to retract the pit retaining prongs 30 preparatory to the fruit spreading unit receiving another peach at the feed station F.

The turret or carrier 22 of the pitting machine 24 includes a disc 42 (FIG. 3) fixed to opposite flanges 44 of a mounting hub 46. The hub 46 is keyed to a horizontal transverse drive shaft 48 which is journalled in opposite bearings 50 fixed to a frame or support structure 52 of the machine.

A belt and sheave transmission 54 (FIG. 2), that is connected to a motor M mounted on the frame structure 52, drives a countershaft 56 which is suitably journalled, by means not shown, in the frame structure 52. A drive pinion 58, carried by the countershaft 56, drives a relatively larger gear 60 fixed to the shaft 48 adjacent one end (FIG. 3) to drive the turret 22. The gear 60 meshes with a relatively smaller gear 62 carried by a cam shaft 64 (FIGS. 2 and 3) journalled in suitable bearings 66 (FIG. 3) in the frame structure 52. The ratio of the gears 60 and 62 to each other assures that the cam shaft 64 will rotate six times faster than the turret shaft 48.

Each of the six similar fruit spreading units 20 includes a pair of side-by-side elongate spreader blades 70, (FIG. 6) each of which is fixed to spaced legs 72 of a U-shaped lever arm 74 (FIG. 4). The cooperating lever arms 74 are pivoted on shafts 76, respectively, each of which is rotatably supported in two spaced ears 78 projecting from one of the flanges 44 of the hub 46 (FIGS. 4 and 8). The spaced ears 78 of the two flanges 44 are aligned with each other and are located at opposite sides of the disc 42. In this way the confronting spreader blades 70 of each fruit spreading unit 20 are mounted for pivotal movement between fruit receiving position (FIGS. 4 and 9) wherein the radially outer portions of the blades 70 converge at a shallow included angle adjacent the periphery of the disc 42, and a fruit spreading position (lower portion of FIG. 3) wherein the outer blade portions are spaced from each other.

A compression spring 80 (FIG. 3), confined between the disc 42 and a projection 82 of the adjacent lever arm 74 at each side of the disc 42, reacts on the particular lever arm 74 to urge the spreader blades 70 of each pair toward each other into fruit receiving position (FIG. 4). It will be noted that the disc 42 has a peripheral opening 84 associated with each fruit spreading unit 20 which accommodates certain parts of the pit holding or retaining mechanism 32 and enables the outer portions of each pair of blades 70, when in fruit receiving position, to contact each other.

Each of the spreader blades 70 has a longitudinally extending compound slot 88 (FIGS. 4 and 6) including an inner slot portion 90 and an outer slot portion 92 (FIG. 4). The inner slot portions 90 in the blades 70 of one fruit dividing means 20 accommodate various parts of the pit retaining mechanism 32 in a manner later to be disclosed more fully. Each outer slot portion 92 is concave and of generally elliptical form, having the edges 94 thereof flare arcuately from the inner slot portion 90 toward the outer edge 96 of the blade 70. The arcuate edges 94 of the outer slot portions 92, as well as the outer edge 96 of the blades 70, are sharpened as shown best in FIG. 4. Thus, when a peach, having its suture plane aligned with the turret disc 42, is impaled at the feed station F on the cooperating spreader blades 70 of one fruit dividing means 20 the edges 96 and the edges 94 defining the registering slot portions 92, sever the meat of the peach throughout approximately half its diameter extending inward of the peach from the stem end. Since the blades 70 diverge from the edges 96 inward of the turret, the fruit meat in the immediate vicinity of the stem end of the peach is spread outward (FIG. 9) away from the pit to enable entry of the pit retaining prongs 30 into the peach with little or no damage to the meat of the peach. Additionally, the peach pit entering the registering outer slot portions 92 engages the conforming edges 94 thereof to locate the peach in predetermined position on the turret 22.

As shown best in FIGS. 4, 9 and 10, a freely rotatable cam follower 98 is mounted on each lever arm 74 at a location farthest removed from the disc 42 axially of the turret 22.

The processing station P (FIG. 1) is located adjacent the turret 22 diametrically opposite the feed station F and includes the previously mentioned splitting means 34 and the fruit presser means 36. The splitting means 34 comprises an arm 100 which is bifurcated and has in general, the configuration of an inverted Y (FIG. 5). Arm portions 102 and 103 of the inverted Y extend downward from a stem 104 and are pivoted on a horizontal transverse shaft 106 fixed to opposite sides of the frame structure 52. The stem 104 has a forward projection 108 at its upper end rigidly mounting a splitting blade 110 for movement with the arm 100. The splitting blade 110 thus mounted, is movable in the plane of the disc 42 upon movement of the arm toward and away from the turret 22.

A disc cam 112 (FIG. 5), mounted on the cam shaft 64 for rotation therewith and for angular adjustment with respect thereto, is engaged by a cam follower roller 114 of a linkage system 116 to effect movement of the arm 100. The linkage system 116 includes a lever 118 that carries roller 114 and is pivotably connected adjacent its upper end to the frame structure 52 at 119 (FIG. 1) and adjacent its lower end to the forward end portion of an elongate link 120. The link 120 has a longitudinal slot 122 (FIG. 1) adjacent its rear end in which a stud 124, carried by the arm 102 of the Y-shaped arm 100, is slidably disposed.

A tension spring 126 is connected at one end adjacent the lower end of the lever 118 and at the other end to the hooked end 128 of a rod 130 which is axially adjustable in a stud 132 pivoted in the arm portion 102. The spring 126 reacts on the lever 118 as well as on the arm 100 to maintain the follower roller 114 in resilient engagement with the cam 112, and to urge the arm 100 forward to a position wherein the stud 124 carried by arm 102 is normally in engagement with the link 120 at the forward end of the slot 122. It will be apparent, therefore, that the cam 112 effects forward movement of the arm 100 by action of the spring 126 and positively moves the arm 100 rearward once each time any one of the six fruit dividing means 20 is advanced by the turret 22 through the processing station P.

The lost motion connection provided by the stud 124 of the arm 100 and the slot 122 of the link 120, enables the splitting blade 110 to cut through the fruit meat and yieldably engage the pit of a peach in the processing station P under the resilient action of the spring 126. An abutment stop 134 (FIG. 1), rigid with the frame structure 52, is engaged by an adjustable abutment 136 carried by the arm 100 to limit forward movement of the arm 100. In this way the splitting blade 100 is prevented from striking the turret 22 in case the peach pit is smaller than average or no peach is located on any one of the fruit dividing means 20.

The fruit presser means 36, is moved into engagement with a peach on the turret 22 subsequently to forward movement of the splitting means 34. In this way each peach is pressed radially inward of the turret to seat the pit firmly in the outer slot portions 92 of the cooperating spreader blades 70 as well as in the cooperating prongs 30 of each fruit dividing means 20 traversing the processing station P in a manner to be explained more fully hereinafter.

The presser means 36 includes a bifurcated arm 144 (FIG. 5) of inverted Y configuration. Arm portions 146 and 148, extending downward from an elongate stem 150 of the arm 144, are also pivoted on the shaft 106 outward of the arm portions 102 and 103 of the arm 100. The stem 150 includes a transverse presser plate 152 which has a longitudinal slot 154 extending downward from the upper end of the stem. The slot 154 is so located in the presser plate 152 as to enable the splitting blade 110 to project therethrough without either the presser plate 152 or splitting blade 110 interfering with the movement of the other.

Forward and rearward pivotal movement of the arm 144 about the shaft 106 moves the presser plate 152 into and out of peach seating engagement with the blossom end of each peach successively traversing the processing station P. Such movement is effected by a disc cam 156 (FIG. 5) mounted on the cam shaft 64 for rotation therewith and for angular adjustment with respect thereto by means not shown. The periphery of the cam 156 is engaged by a cam follower roller 158 that is freely rotatable on a lever 160 of a linkage system 162 to effect movement of the presser arm 144. The lever 160 is pivotably connected adjacent its upper end to the frame structure 52 by means of pin 161, and adjacent its lower end to an elongate link 164, the length of which is adjustable. The link 164 has a longitudinal slot 166 (FIG. 2) adjacent its rear end in which a stud 168, that is fixed to the arm portion 148 of the presser arm 144, is slidably disposed.

A tension spring 169 is connected at one end adjacent the forward end of the link 164 and at the other end to the hooked end 170 of a rod 172 which is axially adjustable in a stud 174 pivoted in the arm portion 148. The spring 169 reacts on the lever 160 as well as on the presser arm 144 to thereby maintain the follower roller 158 in resilient engagement with the cam 156 and to urge the presser arm 144 to a position wherein the stud 168 thereof is normally in engagement with the link 164 at the forward end of the slot 166. Therefore, it will be apparent that the cam 156 effects forward movement of the presser arm 144 by the action of the spring 169 and positively moves the presser arm 144 rearward through link 164, once each time any one of the six fruit dividing means 20 is advanced by the turret 22 through the processing station P.

The lost motion connection provided by the stud 168 of the presser arm 144 in the slot 166 of the link 164 enables the presser plate 152, under the resilient action of the spring 169, to yieldingly engage the blossom end of the peaches traversing the processing station P. In this way each peach is pressed radially inward of the turret to firmly seat its pit between the projected pit retaining prongs 30 and the outer slot portions 92 of the associated cooperating spreader blades 70 during processing at station P. The processing includes the severing operation performed by the splitting blade 110 and the spreading action, to be described, performed by the blades 70 of the fruit dividing means 20.

During the latter part of the operation performed by the fruit presser means 36 and before retraction of the splitting blade 110 after the peach meat has been completely severed, the cooperating spreader blades 70 of the fruit spreading means 20 concerned are actuated to separate the opposite peach halves and initiate their gravity discharge from the turret 22. Immediately prior to such operation of the pair of spreader blades 70, each of the cam follower rollers 98 of the blade mounting lever arms 74 concerned is in the operational range of an arcuate peach-discharge cam 184 (FIG. 8).

The cams 184 are fixed to arms 186, respectively, which are rigid with and project upward from a pivot shaft 188 (FIG. 5) mounted for rotation in bearings 190 of the frame structure 52. One of the arms 186 (FIG. 5) comprises part of a bell crank which includes another arm 192 projecting forward from the shaft 188 beneath the cam shaft 64. A cam follower roller 194, rotatable on the arm 192 adjacent its forward end, is aligned with a disc cam 196 fixed to the cam shaft 64. Because of the configuration of the cam 196, the follower rollers 98 of each fruit spreading means 20 is effective to move the cams 184 rearward to their retracted positions (FIG. 5). Thus, when the follower rollers 98 of the next fruit spreading means 20 comes initially into the range of the cams 184, the rollers 98 are not engaged thereby with sufficient force to pivot the blades 70 thereof outward. However, shortly after the follower rollers 98 come into the operational range of the cams 184, the follower roller 194 is engaged by an abrupt rise on the cam 196 to swing the cams 184 forward and thereby instantaneously move the spreader blades 70 of a cooperating pair thereof away from each other (FIGS. 1 and 6). This action is effective to separate the peach halves from each other and from the pit, which is held by the pit retaining prongs 30, and to free the peach halves for gravity discharge from the turret 22.

It is to be understood that, with the exception of both the peach holding apparatus 28 and the pit retaining mechanism 32, which embody the present invention and will hereinafter be described in detail, the previously described structure of the peach pitting machine 24 is similar to corresponding structure disclosed in Patent No. 2,704,561 of C. R. Thompson for Freestone Fruit Pitter.

Since the Thompson patent may be referred to for a more thorough understanding of structure constituting the environment of the present invention, the description of such structure has been abridged herein.

Heretofore, fixed pit retaining means such as that shown in the previously mentioned Thompson patent have been frequently employed to prevent any movement of an impaled peach laterally of the turret or carrier while being advanced to the processing station P from the feed station F as well as to temporarily retain the pit on the turret during separation of the peach halves from the pit. Such known pit retaining means do extensive damage to the fruit meat at the stem end of the peach. The present pit holding mechanism 32, which minimizes such damage, contributes to the production of pitted freestone peaches of high quality than obtainable by pitters having fixed pit retaining means of the type mentioned.

The pit holding mechanism 32, operatively associated with each pair of spreader blades 70 (FIGS. 9 and 10), includes duplicate structures arranged symmetrically at opposite sides of the vertical turret disc 42 to actuate the pit securing or retaining prongs 30. Because of this, the structure associated with but one pit retaining prong or tine 30 will be described. The description of one such structure will, however, apply fully to the structures associated with both prongs 30 of each pit retaining mechanism 32.

Each prong 30 (FIG. 9) is relatively slender and is curved throughout its length and is formed on the inner end of a link 200. As seen in FIG. 6, the two links 200 are disposed side by side in planes that extend generally radially of the turret. Each link 200 is pivotably connected at its outer end by a pin 202 (FIG. 9) to the outer end of an arm 204. Each arm 204 extends generally radially of the turret and is mounted on the adjacent shaft 76 which is pivotable in the ears 78. The arm 204 is fixed to the shaft 76 and thus prevents axial displament of the shaft 76 from the ears 78. A guide pin 206, projecting from one side of each link 200 adjacent the prong 30, is engaged in a slot 208 of a guide member 210. As seen in FIG. 6, one guide member 210 is disposed adjacent each lnik 200 and, as seen in FIG. 10, one guide member 210 is disposed on each side of the turret disc 42. The member 210 on the left side of disc 42 (FIG. 10) is formed on a strap 210a and the member 210 on the right side of disc 42 is formed on a strap 210b. Capscrews 211 (FIG. 6) secure both straps to the disc 42 as seen in FIG. 10. It is to be noted in FIG. 6 that each spreader blade 70 has a recess 213 which receives the associated straps 210a and 210b permitting the straps to be secured to the disc. The slot 208 in each member 210 extends obliquely outward of the turret 22 in a radial plane thereof toward the opposite side of the disc 42.

The arm 204 (FIG. 10) is provided at its outer end with a cam follower roller 212 which is engageable with a generally circular cam track 214. The cam track 214 is supported in fixed position on the frame structure 52 at one side of the turret 22 in a plane substantially parallel to the plane of the disc 42 and concentrically of the turret 22 by a plurality of braces 214a. The cam track 214 extends clockwise (FIG. 6) from approximately the eleven o'clock position to approximately the eight o'clock position.

It will be understood that at the time of feeding a peach onto the turret 22, the pit securing prongs 30 of the pit retaining mechanism 32 concerned are retracted as shown in FIGS. 4, 6 and 9 in the inner slot portions 90 of a pair of blades 70. When the prongs 30 are in this position their free ends are positioned close to each other adjacent the stem end of the pit and are ready to enter the peach between the pit and the outwardly pressed fruit meat (FIG. 9). When this peach arrives at the eleven o'clock position (FIG. 6) the cam follower rollers 212 associated therewith (FIG. 9) engage uniformly inclined rise portions 216 of the cam tracks 214. Thereafter, during further movement of the turret 22, the arms 204 of the associated prongs 30 are moved by the cam portions 216 longitudinally upward along arcuate paths conforming in general to the longitudinal curvature of the stem end portion of a peach pit. The arcuate prongs enter the fruit meat from the stem end of the peach adjacent thereto and travel upward in the peach close to the pit. As the guide pins 206 move from the inner ends to the outer ends of the guide slots 208, the prongs will be fully projected into the peach in contiguous relation with the pit at opposite sides thereof (FIG. 10) by the time the peach reaches the twelve o'clock position (FIG. 6). Thus, the pit is retained by the projected prongs 30 when the peach is at a point approximately 90° of rotation of the turret 22 prior to arrival of the peach at the processing station P located at approximately the three three o'clock position (FIG. 6). It will be apparent that because of the location at which the arcuate prongs 30 enter the peach and the manner in which the prongs are projected along arcuate paths into the peach close to the pit little or no damage is done to the fruit meat.

The cam tracks 214, following the rise portions 216, continue to hold the prongs 30 projected until that particular pit retaining mechanism 32 reaches the eight o'clock position (FIG. 6) after which the follower rollers 212 ride off the circular cam tracks 214. Immediately following this disengagement of the follower rollers 212 with the cam tracks 214, the follower rollers 212 engage opposite prong retracting cams 220 rigid with the frame structure 52 which move the arms 204 of the pit holding mechanism 32 to retract the prongs 30 from the position shown in FIG. 10 to the position shown in FIG. 9.

The peach holding apparatus 28 of the present invention comprises an upwardly directed lever 230 (FIG. 6) having a sleeve 232 fixed thereto adjacent its lower end. The sleeve 232, which is freely rotatable on the turret shaft 48 (FIGS. 6 and 9), is held against axial movement on the shaft 48 between the adjacent one of the bearings 50 and the inner end of the hub 46. The lever 230 is thus mounted for pivotal movement in fixed location at one side of the disc 42.

A peach hold-down cup 234 is mounted on the lever 230 adjacent its upper end for movement thereon into and out of engagement with each peach carried by the various fruit spreading means 20. The lower end of the lever 230 is operatively connected with a cam 236 carried by the cam shaft 64 for oscillating the lever 230 and the associated cup 234 a limited distance fore-and-aft of the machine 24 in a manner to be more fully disclosed. In this way, the cup 234 is moved rearward in synchronism with one fruit dividing means 20 of the rotating turret 22 and then forward to synchronize during its next rearward movement with the immediately succeeding fruit dividing means 20.

The fruit hold-down cup 234 is formed of relatively thin material (FIGS. 9 and 10) and is generally of oval or pear shape configuration in plan, as may be best understood from FIG. 8. The crown portion of the cup 234 (FIGS. 9 and 10) has a bolt 238 fixed thereto, securely attaching the cup, in inverted condition, to the outer end portion of a laterally offset arm 240 (FIGS. 8–12). The other end of the arm 240 has a boss 242 (FIGS. 7 and 8) mounted on one end portion of a shaft 244 and secured thereto by a set screw 246 (FIG. 8). The shaft 244 is journalled for rotation in a sleeve bearing 248 (FIG. 7) fixed to and projecting from both sides of the lever 230 in parallel relation to the turret shaft 48. A cup raising arm 254, having a boss 256 at one end that is fixed by a set screw 258 to the other end portion of the shaft 244, projects radially therefrom. In this way, the cup mounting arm 240 and the cup raising arm 254 are interconnected to provide a bell crank mounted for pivotal movement in the bearing 248.

As understood best from FIGS. 8–10, the major axis of the pear shaped cup 234 lies in the midplane of the disc 42. Since it is important that this relationship be maintained, the bosses 242 and 256 of the arms 240 and 254, respectively, abut opposite ends of the sleeve bearing 248. This prevents axial shifting of the shaft 244 and consequent movement of the cup 234 laterally with respect to the lever 230 which is held against shifting in the manner described.

The pear shaped cup 234 has its largest diameter end 260 spaced in the direction of turret rotation from the distal end of the arm 240. The end portion 260 is hollow, having a partially spherical portion providing a concave pocket. The other end portion 262 of the cup 234 becomes less concave as it extends away from the portion 260 and turns upward adjacent the distal end of the arm 240. The entire surface of the cup 234 in the concave area is lined with a layer 264 (FIGS. 6 and 8–12) of resilient material such as sponge rubber or plastic. The layer 264 is bevelled downwardly and inwardly of the cup 234 as at 266 (FIG. 6). The bevel 266 and the upturned end portion 262 aid in preventing engagement between the cup 234 and the turret 22 in case no peach is carried by any of the fruit dividing means 20. The spherical end portion 260 of the cup 234 seats firmly upon each peach in succession throughout the prong projecting operation.

A torsion spring 268 (FIG. 7), coiled on a cylindrical support member 270 fixed to the bearing 248, has its opposite axially extending ends 272 and 274 (FIG. 7) engaging the lever 230 and the offset arm 240, respectively. The spring 268 urges the offset arm 240 and consequently the cup 234 carried thereby in a downward direction.

A stop bolt 276 screwed into a lateral projection 278 (FIG. 6) carried by the lever 230 is engaged by the cup raising arm 254 intermediate the ends thereof. A lock nut 280 threaded onto the stop bolt 276 is employed in a well known manner to retain the stop bolt in adjusted position. On engagement of the arm 254 with the stop bolt 276, the cup 234 is prevented from pivoting downward to a position where it might contact the moving turret 22 when no peach is carried thereby.

A pneumatic dampener 286 is operatively interposed between the offset arm 240 and the lever 230 and includes a cylinder 288 having a piston (not shown) therein. A piston rod 290 connected to the piston (not shown) projects from one end of the cylinder 288 and is pivotally connected by a pin 292 to an arm 294 projecting radially from the boss 242. The cylinder 288 is closed at its other end which is pivotally connected by a bolt 296 to an L-shaped bracket 298. The bracket 298 is fixed to the top of the lever 230, and holds the dampener 286 in a position for the outer end of the piston rod 290 connected to the arm 294 to be actuated thereby upon pivotal movement of the cup mounting arm 240. The cylinder 288 is vented in a well known manner (not shown) to appropriately restrict the discharge of air therefrom to restrain the cup mounting arm 240 against uncontrolled downward movement under the action of the torsion spring 268.

When the cup 234 approaches the end of its rearward travel, it is swung upward, in a manner to be described hereinafter, against the force of the torsion spring 268 and is retained in raised condition by a latch 302 (FIGS. 8, 11 and 12). While the cup 234 is latched in the raised condition, the lever 230 moves the cup 234 forward, in a manner also to be described, into registry with the outer slot portions 92 of the succeeding fruit spreading means 20 on the rotating turret 22. At this time the cup 234 is unlatched and descends upon a peach if one is impaled on the blades 70 of the fruit spreading means mentioned.

The latch 302 includes a bar 304 pivoted adjacent its mid-portion on a pin 306 carried in a U-shaped bracket 308 fixed to the side of the lever 230 near the cup support arm 254. A compression spring 310 (FIGS. 11 and 12), extending between the upper end portion of the bar 304 and an adjacent tongue 312 on the lever 230, urges the upper end portion of the bar 304 toward the arm 240. The upper end of the bar 304 has a notch 314 (FIG. 8) facing the arm 240 to receive the end of a projection 316 thereon to latch the cup 234 in raised condition. Upon movement of the lower end portion of the bar 304 away from the lever 230, the latch 302 releases the arm 240 whereupon the arm 240 and the cup 234 thereon are lowered by the action of the torsion spring 268 under the control of the dampener 286.

As the cup, when retained in lowered condition upon the peach carried by the turret 22, approaches the end of its rearward movement, the outer end of the cup raising arm 254 (FIG. 11) engages an abutment stop 322 to pivot upward or raise the cup. The abutment stop 322, positioned in the path of the advancing arm 254, is fixed to a bracket 324 (FIGS. 1, 8, 11 and 12) bolted to the frame structure 52. Thus, when the cup 234 reaches the end of its rearward movement it is fully raised (FIG. 11) enabling the latch to be urged by the spring 310 to a position with the notch 314 thereon engaging the projection 316 of the arm 240 to releasably retain the same and the cup 234 in raised condition.

During forward movement of the cup 234, and as it approaches the forward end of such movement, the lower end portion of the bar 304 engages a release cam 326 (FIG. 12). The cam 326 is fixed to a bracket 328 rigid with the frame structure 52 at the same side as that to which the abutment stop 322 is fixed. An inclined camming surface 330 of the cam 326 (FIGS. 8 and 11) is positioned so as to be engaged by the lower end portion of the approaching latch bar 304. The camming surface 330 is inclined in such a manner that, when the cup is at the end of its forward movement, the latch bar 304 will be withdrawn (FIGS. 1 and 8) against the force of the spring 310 from supporting engagement with the projection 316 on the cup support arm 240. The arm 240 is thus released and the cup 234, in registry with the outer slot portions 92 of a fruit spreading means 20 therebelow, is lowered in the manner previously described.

In order to actuate the lever 230 and move the peach holding cup 234 fore-and-aft of the machine 24, the lever 230 (FIG. 6) is pivotally interconnected by a link 334 to the forward end of a cam actuated arm 336. The opposite end of the cam actuated arm 336 is pivoted on a stud 338 rigid with the frame structure 52. A tension spring 340, connected between the frame structure 52 and the outer end of the cam actuated arm 336, urges the same downward (FIG. 6). The lever 230 is thus urged in a counterclockwise direction (FIG. 6) and a freely rotatable cam follower roller 342, carried by the arm 336, is retained in resilient engagement with the periphery of the previously mentioned cam 236.

The cam 236 is angularly adjustable on the cam shaft 64 in a well known manner to synchronize the fore-and-aft oscillating movement of the cup 234 with that of the advance of each fruit dividing means 20. In addition, the length of the link 334 is adjustable so as to bring the cup 234 into precise registry with the outer notch portions 92 of the blades 70.

Let it be assumed that the peach pitter 24 is in operation and that a peach, previously fed into the machine onto one pair of spreader blades 70 at the feed station F, has its pit seated in the outer notch portions 92 and is now engaged by the peach holding cup 234 which is in its forward and lowered position (FIGS. 1, 2, 6, 8 and 9). At this time the cup 234 is held against the peach under the full force of the torsion spring 268 and is therefore unable, under normal operating conditions, to move radially outward of the turret 22 from the positions shown in FIG. 9. The cam 236, rotating in the direction indicated by the arrow 344 (FIG. 6), is at this time engaged at its low dwell 236L by the cam follower 342. While the peach is thus held in position on the turret 22 with the cup 234 engaging the peach, the peach is advanced by the turret from the eleven o'clock position shown in full lines in FIGS. 6 and 8 to the twelve o'clock position shown in phantom in FIG. 6. This rearward movement of the cup 234 in synchronism with the turret is performed by a rise 236R of the cam, extending between the low dwell 236L and the high dwell 236H, as the cam 236 rotates in the direction indicated by the arrow 344. When the cup 234 is in the transitory position shown in phantom (FIG. 6), the rise 236R engages the follower roller 342 in the region somewhat prior to engagement of the high dwell 236H therewith and at a time when the cup raising arm 254 has made initial engagement (not shown) with the abutment stop 322. As understood best from FIGS. 6 and 9, when the cup 234 is holding a peach located at the eleven o'clock position (FIG. 6), the pit securing prongs 30 of the associated pit retaining mechanism 32 are still retracted (FIG. 9) but the cam follower rollers 212 thereof have made first engagement with the opposite rise portions 216 of the circular cam tracks 214 (FIGS. 6, 8 and 9). Thus, it will be clear that as the peach is advanced by the carrier or turret from the eleven o'clock position to the twelve o'clock position (FIG. 6) and is held by the cup 234 against radial outward movement on the carrier 22, the prongs 30 are thrust into the peach adjacent its stem end at a point between the fruit meat which has been forced away from the pit (FIG. 9) and the pit. The prongs 30 are projected from the position shown in FIG. 9 to the position shown in FIG. 10 as the follower rollers 212 ascend the rise portions 216 of the circular cams 214. After the prongs 30 are fully projected (FIG. 10) to retain the peach pit against movement laterally of the turret, the holding cup 234 is withdrawn from engagement with the peach.

Movement of the cup 234, generally radially outward of the turret 22 from the position shown in FIG. 8 to the position shown in FIG. 11 to withdraw the cup from the peach occurs during final rearward movement of the cup 234 by the lever 230. This movement occurs after initial engagement of the cup raising arm 254 with the abutment stop 322 and continues until arrival of the high dwell 236H of the cam 236 in engagement with the cam follower 342. Upon full upward swinging movement of the cup 234 against the urgency of the torsion spring 268, the latch bar 304 drops in behind the projection 316 of the arm 240 to hold the same and the cup carried thereby in their raised or cocked position (FIG. 11). Thereafter, the peach, whose pit has just been retained by the prongs 30 (FIG. 10) in predetermined position on the carrier 22 is advanced to the processing station P. It is thus assured that each peach whose pit is retained by the prongs 30 of the present invention is accurately positioned on the turret prior and during performance of the pitting operation previously described. For this reason the splitting knife 110 accurately completes the severing of the fruit meat on the suture plane of the peach.

Continued rotation of the cam 236 brings its descending surface 236D, extending from the high dwell 236H to the low dwell 236L, into engagement with the cam follower 342. As a result, the cup 234 is swung forward by the lever 230, under the influence of the spring 340, from the position shown in FIG. 11 to the transitory position shown in FIG. 12.

At the time the cup 234 arrives in the position shown in FIG. 12, the lower end of the latch bar 304 engages the camming surface 330 of the release cam 326 prior to arrival of the low dwell 236L in engagement with the follower roller 342. Final forward movement of the lever 230 and the cup 234 from the position shown in FIG. 12 to the position shown in FIG. 8 brings the cup into registry with the peach on the succeeding fruit dividing means 20. This same final movement of the lever 230, even though small, carries the lower end portion of the latch bar 304 along the camming surface 330 to withdraw the bar 304 from engagement with the arm 240 at the moment of registry of the cup 234 with the succeeding peach. The torsion spring 268 then lowers the cup 234 (FIG. 8) under the control of the dampener 236 into holding or clamping relation with the peach into which the associated prongs 30 are to be thrust.

The cup 234 is moved into and held in clamping relation in the manner described with each peach carried by the turret 22. During the time each peach is so held the prongs 30 of the associated pit retaining mechanism 32 are thrust into the peach in the manner described to produce little or no damage to the fruit meat to retain the pit thereof safely against lateral movement with respect to the turret to hold the peach in predetermined position during completion of the severing and to temporarily retain the pit while the peach halves are separated therefrom during the pitting operation.

The pit retaining means of the previously mentioned Thompson patent is a U-shaped member or fork having substantially parallel tines or prongs which are thrust into a peach at opposite sides of the pit to restrain movement of the pit laterally of the turret disc. Since these prongs must be spaced apart a distance equal to the thickness of the pit the points of entry of the prongs into the fruit meat at the stem end of the peach are widely spaced from the actual stem end of the pit. For this reason, when the peach halves are separated from the pit which is temporarily retained by the U-shaped pit retaining means, the fruit meat lying between the prongs will be torn away and multilated. Peach halves thus multilated are consequently downgraded from choice resulting in a related financial loss.

The tips of the arcuate pit retaining prongs 30 of the present invention, when the prongs 30 are in retracted position, are close together, immediately adjacent the stem end of the pit. When these prongs are thrust upward into the peach they enter in the area where the fruit meat has been pressed away from the stem end of the pit and enter the peach without damage to the fruit meat. Continued movement of the arcuate prongs 30 to fully projected position moves them along arcuate paths in contiguous relation with the curved stem end portion of the pit. Thus, the prongs 30 of the present invention enter the peach and move into the peach between the fruit meat and the pit. When the peach halves are separated from their pit by the spreader blades 70 of the present apparatus the fruit meat is not torn away or multilated, since no fruit meat lies between the prongs 30. For this reason, little or no damage is done to the peach halves that would result in their being downgraded.

While a particular embodiment of the present invention has been shown and described, it will be understood that the peach holding apparatus 28 and pit retaining mechanism 32 of the present invention are capable of modification and variation without departing from the principles of the invention, and that the scope of the invention should be limited only by the scope and proper interpretation of the claims appended hereto.

The invention having thus been described, what is believed to be new and desired to be protected by Letters Patent is:

1. In a fruit pitting machine, a movable fruit carrier having a certain location thereon at which a fruit received stem end first is positioned, inwardly curved elongate pit retaining prongs mounted for longitudinal movement on said carrier into positions at opposite sides of the pit of the fruit positioned at said certain location on said movable carrier, said pit retaining prongs being movable between retracted and projected positions along curved paths conforming substantially to the longitudinal curvature of the pit of the fruit positioned at said certain location on said movable carrier, the free ends of said prongs being close to each other adjacent the stem end of the fruit when said prongs are in retracted positions, and means for projecting said curved prongs along said curved paths into conforming contiguous retaining relation with the pit of the fruit positioned at said certain location on said carrier.

2. In a fruit pitting machine, support means having a certain location thereon for receiving a fruit stem end first, spaced elongate pit retaining prongs extending in an inward curve throughout their lengths and conforming substantially to the longitudinal curvature of the pit of a fruit to be pitted, said pit retaining prongs being mounted on said fruit receiving means for longitudinal movement along opposite sides of the pit of a fruit positioned at said certain location in curved paths conforming substantially to the longitudinal curvature of the pit of the fruit between retracted and projected positions, the free ends of said prongs being close to each other adjacent the stem end of the fruit when said prongs are in retracted position, and means for projecting said curved prongs along said curved paths into conforming contiguous retaining relation with the pit of the fruit after the fruit is positioned at said certain location on said support means.

3. In a fruit pitting machine, a movable fruit carrier having a certain location thereon at which to receive a fruit stem end first, spaced elongate pit retaining prongs extending in an inward curve throughout their lengths and conforming substantially to the longitudinal curvature of the pit of a fruit to be pitted, said pit retaining prongs being mounted for longitudinal movement on said carrier along opposite sides of the pit of a fruit positioned at said certain location in curved paths conforming substantially to the longitudinal curvature of the pit of the fruit between retracted and projected positions, the free ends of said prongs being close to each other adjacent the stem end of the fruit when said prongs are in said retracted positions, means for projecting said prongs along said curved paths into conforming contiguous retaining relation with the pit of said fruit after said fruit is positioned at said certain location, and means for holding said fruit against movement on said movable carrier at said certain location during projection of said prongs into the fruit.

4. A fruit pitting machine having a movable carrier and confronting spreader blades mounted on said carrier and movable thereon from fruit-receiving relation adjacent each other wherein a fruit may be impaled on said blades to fruit discharging position wherein said blades are spaced from each other, each blade having portions defining a pit receiving notch portion located opposite a notch portion of the other blade, the pit of a fruit impaled on said spreader blades when in fruit-receiving relation being received by the registering notches of said blades in engagement with the notch defining blade portions at spaced locations about the pit, the improvement comprising arcuate pit retaining prongs conforming to the curvature of the pit and mounted on said carrier adjacent said spreader blades, said arcuate pit retaining prongs being movable longitudinally on said carrier along arcuate paths from inoperative position to operative position into a fruit on said blades that has its pit in said registering notches and at locations spaced from each other about said pit and from said notch defining blade portions into contiguous relation with said pit to retain the pit against movement laterally of said spreader blades, and a fruit holder operably mounted adjacent said carrier, said fruit holder being movable into engagement with the fruit impaled on said spreader blades with the pit in said notches and movable in synchronism with said carrier while in engagement with the fruit and throughout movement of said pit retaining means into operative position during the time said spreader blades are in fruit receiving relation.

5. A fruit pitting machine comprising a movable fruit carrier, a pit holding prong unit mounted on said carrier for movement therewith, said pit holding prong unit being movable relatively to said carrier between a retracted position and a projected position, means for moving said prong unit throughout a predetermined interval of movement of said carrier from the retracted position to the projected position into a fruit at a certain location on said carrier, fruit engaging means mounted adjacent said carrier and movable therewith in registry with said pit holding prong unit throughout said predetermined interval of movement of said carrier and for movement into engagement with the fruit at said certain location on said carrier, and means operatively connected to said fruit engaging means for moving the same into engagement with the fruit at said certain location at the beginning of said predetermined interval of movement of said carrier and for retaining said fruit engaging means in engagement with the fruit throughout said predetermined interval of movement of said carrier to thereby secure the fruit against movement with said prong unit relatively to said carrier throughout the time said pit holding prong unit is being projected.

6. A fruit pitting machine comprising a movable fruit carrier, a retaining prong mechanism mounted on said carrier for advancement therewith and for movement of a prong thereof relatively to the carrier from a retracted position to a projected position to impale a fruit at a certain location on said carrier, means positioned adjacent said carrier and engageable with said retaining prong mechanism during advance of said carrier for projecting said prong, a lever pivotably mounted adjacent said carrier, a bell crank pivotable on said lever, fruit engaging means carried by a first arm of said bell crank and mounted thereby for movement toward and away from said fruit carrier between operative and standby positions, spring means engaging said first arm of said bell crank and urging said first arm in a direction to move said fruit engaging means into operative position, a latch carried by said lever and operable to engage said bell crank to latch the same in a position with said fruit engaging means in standby position, means operatively connected with said carrier and operable to pivot said lever into a position with said fruit engaging means in registry with the fruit at said certain location prior to projection of said retaining prong and to advance said fruit engaging means in registry with the fruit during advance of the carrier throughout the time said prong is being projected, and means for releasing said latch when said fruit engaging means and the fruit at said certain location on said carrier are in registry for movement of said fruit engaging means by said spring means from standby position to operative position.

7. A fruit pitting machine comprising a movable fruit carrier, a retaining prong mechanism mounted on said carrier for advancement therewith and for movement of a prong thereof relatively to the carrier from a retracted position to a projected position to impale a fruit at a certain location on said carrier, means positioned adjacent said carrier and engageable with said prong mechanism during advance of said carrier for projecting said prong, a lever pivotably mounted adjacent said carrier, a bell crank pivotable on said lever, fruit engaging means carried by a first arm of said bell crank and mounted thereby for movement toward and away from said fruit carrier between operative and standby positions, spring means engaging said first arm of said bell crank and urging said first arm in a direction to move said fruit engaging means into operative position, a latch carried by said lever and operable to engage said bell crank to latch the same in a position with said fruit engaging means in standby position, means operatively connected with said carrier and operable to pivot said lever into a position with said fruit engaging means in registry with the fruit at said certain location prior to projection of said retaining prong and to advance said fruit engaging means in registry with the fruit during advance of the carrier throughout the time said prong is being projected, and means engaged by the other arm of said bell crank at a time when the retaining prong is fully projected to move said fruit engaging means from operative position to standby position.

8. A fruit pitting machine comprising a movable fruit carrier, a pit retaining prong mounted on said carrier for movement therewith, said pit retaining prong being movable relatively to said carrier between a retracted position and a projected position into a fruit at a certain location on said carrier, means for moving said pit retaining prong from the retracted position to the projected position throughout a predetermined interval of movement of said carrier, fruit engaging means mounted adjacent said carrier for movement therewith in registry with said pit retaining prong during movement thereof with said carrier throughout said predetermined interval of movement of said carrier and for movement into engagement with a fruit at said certain location on said carrier, means operatively connected to said fruit engaging means for moving the same into engagement with the fruit at said certain location and for retaining said fruit engaging means in engagement with the fruit during said predetermined interval of movement of said carrier to thereby secure the fruit against movement relatively to said carrier throughout the time said pit retaining prong is being projected, and means operatively connected to said fruit engaging means for moving the same in registry with said pit retaining prong throughout said predetermined interval of movement of said carrier.

9. A fruit pitting machine comprising a movable fruit carrier, a pit retaining prong mounted at a certain location on said carrier for movement therewith, said pit retaining prong being movable relatively to said carrier between a retracted position and a projected position, means for moving said pit retaining prong throughout a predetermined interval of movement of said carrier from the retracted position to the projected position into a fruit at said certain location on said carrier, fruit engaging means mounted adjacent said carrier and movable therewith in registry with said pit retaining prong and for movement into engagement with the fruit, means operatively connected to said fruit engaging means for moving the same into engagement with the fruit and for retaining said fruit engaging means in engagement with the fruit during said predetermined interval of movement of said carrier to thereby secure the fruit at said certain location against movement with said pit retaining prong relatively to said carrier throughout the time said prong is being projected, and means for moving said fruit engaging means out of fruit securing position following said predetermined interval of movement of said carrier.

10. A fruit pitting machine comprising a movable fruit carrier, a pit retaining prong movably mounted on said carrier and projectable into a fruit at a certain location thereon during advancement of said carrier, and means for projecting said pit retaining prong, fruit engaging means mounted separately from said carrier for advancement therewith and for movement into holding relation with the fruit on said carrier at said certain location, means for moving said fruit holding means in registry with said pit retaining prong during movement of said carrier throughout the time said prong is being projected, means engageable with said fruit engaging means for moving the same into holding relation with the fruit on the carrier throughout the projecting movement of said pit retaining prong to thereby retain the fruit against movement with the prong relatively to said carrier throughout the prong projecting movement, and means for moving said fruit engaging means out of holding relation with the fruit after said pit retaining prong has been projected.

11. In combination, a movable carrier having a series of fruit impaling means thereon, a lever, fruit engaging means adjacent said carrier and mounted on said lever for movement therewith, said fruit engaging means also being mounted for movement on said lever between a retracted position and an operative position into engagement with a fruit located on one of said fruit impaling means, resilient means urging said fruit holding means for movement on said lever toward operative position to secure the fruit at said one fruit impaling means against movement relatively to said carrier, latch means on said lever operable to releasably retain said fruit engaging means in retracted position, latch release means engageable with said latch means and operable to release said fruit engaging means for movement from retracted position to operative position when in registry with the fruit on said one of said fruit impaling means and into engagement with said fruit, means for moving said fruit engaging means into retracted latched position after a predetermined extent of travel thereof in engagement with said fruit on said carrier, and means for moving said lever cyclically in synchronism with movement of said carrier to perform said fruit engaging operation on fruit advanced successively by said carrier at each fruit impaling means.

12. In combination, a movable carrier having a fruit receiving means thereon, fruit engaging means adjacent said carrier, means mounting said fruit engaging means for movement in registry with said fruit receiving means throughout travel of a predetermined extent of said carrier and for movement on said mounting means between a retracted position removed from engagement with a fruit disposed on said fruit receiving means and an operative position in engagement with a fruit disposed on said fruit receiving means, resilient means urging said fruit engaging means toward operative position to resiliently secure the fruit disposed on said fruit receiving means for travel with said carrier, latch means operable to releasably retain said fruit engaging means in retracted position against the action of said resilient means, and latch release means operable to release said fruit engaging means from retracted position when the same is in registry with said fruit receiving means at the beginning of said predetermined extent of travel of said carrier.

13. In a fruit pitting machine, a movable carrier having a fruit receiving means thereon, fruit engaging means adjacent said carrier, means mounting said fruit engaging means for movement in registry with said fruit receiving means throughout travel of a predetermined extent of said carrier and for movement between a retracted position and an operative position into engagement with a fruit engaging said fruit receiving means, resilient means urging said fruit holding means toward operative position to resiliently secure the fruit engaging said fruit receiving means for travel with said carrier, latch means operable to releasably retain said fruit engaging means in retracted position, latch release means operable to release said latch means for movement of said fruit engaging means under the urgency of said resilient means from retracted position when the same is in reigstry with said fruit receiving means at the beginning of said predetermined travel of said carrier, and means operable to engage said fruit engaging means on completion of said predetermined travel of said carrier to positively return said fruit engaging means from operative position to retracted position against the urgency of said resilient means.

14. In a fruit pitting machine, an impaling blade adapted to receive a fruit thereon at a certain location, pit retaining means mounted adjacent said certain location and movable longitudinally from retracted inoperative position to operative projected position in a fruit at said certain location on said impaling blade and at spaced locations about the pit thereof to retain the pit against movement laterally of said blade, means for moving said pit retaining means longitudinally, a movable fruit holder operably mounted adjacent said blade and means synchronized with said means for moving said pit retaining means for moving said fruit holder into engagement with the fruit at said certain location to retain the fruit in fixed position on said impaling blade throughout movement of said pit retaining means from inoperative position into operative position in the fruit.

15. In a fruit pitting machine, carrier means having means for receiving a drupaceous fruit with the pit thereof in a predetermined position on the carrier during the pitting operation, a plurality of spaced elongate pit retaining means movable with said carrier and movable longitudinally along curved paths from inoperative position retracted from a fruit in position to be pitted to operative position projected into the fruit at spaced locations about the pit of the fruit to aid in retaining the pit against movement laterally of said fruit receiving means, and means for projecting said spaced pit retaining means longitudinally from inoperative position to operative position during movement of said carrier means.

16. In a fruit pitting machine, laterally movable spreader blades providing a pit receiving opening in which the pit of a fruit is received, curved edges on said spreader blades bordering opposite portions of said pit receiving opening and defining abutment means engageable by a pit to orient the pit and the fruit in predetermined position with respect to said spreader blades, and pit retaining means mounted adjacent said pit receiving opening and movable from inoperative position retracted from said pit receiving opening to operative position projected into a fruit at spaced locations about the pit to retain the pit against movement laterally of said spreader blades.

17. In a fruit pitting machine, carrier means, laterally movable spreader blade means on said carrier means having a pit receiving opening in which the pit of a fruit to be pitted is seated, a plurality of elongate spaced pit retaining means movable with said carrier means, said pit retaining means being movable longitudinally relatively to said carrier means along spaced curved paths conforming substantially to the curvature of the pit from inoperative position retracted from adjacent the pit receiving opening to operative position projected into position adjacent the pit receiving opening to retain the pit of a fruit on said spreader blade means against movement therewith, means for projecting said spaced pit retaining means longitudinally from inoperative position to operative position during movement of said carrier means, and means for thereafter moving said spreader blade means laterally.

References Cited in the file of this patent

UNITED STATES PATENTS

| 596,343 | Topp | Dec. 28, 1897 |
| 2,185,090 | Millen | Dec. 26, 1939 |
| 2,243,530 | Kok | May 27, 1941 |
| 2,531,927 | Waters | Nov. 28, 1950 |
| 2,704,561 | Thompson | Mar. 22, 1955 |
| 2,751,948 | Facchini | June 26, 1956 |